US011351452B2

United States Patent
Wu et al.

(10) Patent No.: US 11,351,452 B2
(45) Date of Patent: Jun. 7, 2022

(54) METHOD AND APPARATUS FOR CONTROLLING SHOOTING OF VIRTUAL OBJECT, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Shuo Huan Wu, Shenzhen (CN); Zhi Hong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/329,456

(22) Filed: May 25, 2021

(65) Prior Publication Data

US 2021/0275914 A1 Sep. 9, 2021

Related U.S. Application Data

(63) Continuation of application No. PCT/CN2020/093158, filed on May 29, 2020.

(30) Foreign Application Priority Data

May 30, 2019 (CN) .......................... 201910465486.9

(51) Int. Cl.
*A63F 13/426* (2014.01)
*A63F 13/52* (2014.01)
*A63F 13/837* (2014.01)

(52) U.S. Cl.
CPC ............ *A63F 13/426* (2014.09); *A63F 13/52* (2014.09); *A63F 13/837* (2014.09); *A63F 2300/638* (2013.01); *A63F 2300/8076* (2013.01)

(58) Field of Classification Search
CPC ...... A63F 13/426; A63F 13/52; A63F 13/837; A63F 2300/8076
See application file for complete search history.

(56) References Cited

U.S. PATENT DOCUMENTS 8,342,926 B2    1/2013  Garvin et al.
2007/0270215 A1* 11/2007  Miyamoto .............. A63F 13/10
                                                        463/32

(Continued)

FOREIGN PATENT DOCUMENTS

CN      105930081 A    9/2016
CN      107029425 A    8/2017

(Continued)

OTHER PUBLICATIONS

Shadowguns Legends video game, published by Madfinger Games on Mar. 22, 2018, as evidenced by YouTube video at https://www.youtube.com/watch?v=r2rCTTwPd9k. (Year: 2018).*

(Continued)

*Primary Examiner* — James S. McClellan
(74) *Attorney, Agent, or Firm* — Sughrue Mion, PLLC

(57) ABSTRACT

Provided is a method for controlling shooting of a virtual object, including: obtaining a locking area of a first virtual object in a virtual scene; based on determining that an aiming point of a second virtual object being within the locking area for a target duration, displaying locking complete information at a position of the aiming point in the locking area, the locking complete information indicating that locking of the first virtual object is completed; and controlling automatic shooting of the second virtual object on the first virtual object, of which locking is completed, based on the aiming point being located in an under-attack area of the first virtual object, a size of the under-attack area being less than a size of the locking area.

20 Claims, 9 Drawing Sheets

(56) References Cited

U.S. PATENT DOCUMENTS

| | | | |
|---|---|---|---|
| 2010/0009733 A1* | 1/2010 | Garvin | A63F 13/22 463/37 |
| 2015/0157940 A1* | 6/2015 | Hall | A63F 13/837 463/31 |
| 2016/0129345 A1 | 5/2016 | Seok et al. | |

FOREIGN PATENT DOCUMENTS

| | | |
|---|---|---|
| CN | 109718537 A | 5/2019 |
| CN | 110170168 A | 8/2019 |

OTHER PUBLICATIONS

Fortnite mobile video game update with Auto-fire feature, published by Epic Games in 2018 as evidenced by YouTube video by iChase available online https://www.youtube.com/watch?v=r2rCTTwPd9k. (Year: 2018).*

"Fortress Night fire setting mode analysis", 3DMGAME, https://shouyou.3dmgame.com/gl/97736.html, Sep. 7, 2018, 10 pages total.

"Chicken Eating Game with Clear Painting Style!", Without firing key, auto-shoot aft aiming, your little c, https://www.bilibili.com/video/BV1GW411A7kn/, May 6, 2018.

Office Action for corresponding CN 201910465486.9, dated Mar. 3, 2021.

Written Opinion for PCT/CN2020/093158, dated Aug. 28, 2020.

International Search Report for PCT/CN2020/093158, dated Aug. 28, 2020.

Written Opinion of the International Searching Authority dated Aug. 28, 2020 in Application No. PCT/CN2020/093158.

\* cited by examiner

METHOD AND APPARATUS FOR CONTROLLING SHOOTING OF VIRTUAL OBJECT, ELECTRONIC DEVICE, AND STORAGE MEDIUM

CROSS-REFERENCE TO RELATED APPLICATION(S)

This application is a bypass continuation application of International Application No. PCT/CN2020/093158, filed on May 29, 2020 and entitled "METHOD AND DEVICE FOR CONTROLLING SHOOTING PERFORMED WITH RESPECT TO VIRTUAL OBJECT, ELECTRONIC APPARATUS, AND STORAGE MEDIUM", which claims priority to Chinese Patent Application No. 201910465486.9, filed on May 30, 2019 with the China National Intellectual Property Administration and entitled "METHOD AND APPARATUS FOR CONTROLLING SHOOTING OF VIRTUAL OBJECT, ELECTRONIC DEVICE, AND STORAGE MEDIUM", the disclosures of which are herein incorporated by reference in their entireties.

FIELD

The disclosure relates to the field of computer technologies, and in particular, to a method and an apparatus for controlling shooting of a virtual object, an electronic device, and a storage medium.

BACKGROUND

With the development of computer technologies and diversification of terminal functions, various types of games can be played on a terminal. Shooting games are one of popular games. In shooting games, a user generally needs to control a virtual object to use a virtual item to shoot an opponent.

At present, in a method for controlling shooting of a virtual object, generally, a shooting button is provided, and the user may click and/or tap the shooting button, to control, upon detection of a long-press operation on the shooting button, the virtual object to shoot. However, the user needs to perform the long-press operation on the shooting button. In most cases, the user further needs to perform another control operation to perform another function, for example, to adjust a viewing angle. In this case, it is very inconvenient for the user to perform the another control operation simultaneously with the control operation to shoot. Therefore, there is a need for a method for controlling shooting of a virtual object to resolve the foregoing problem.

SUMMARY

According to embodiments provided in the disclosure, a method and an apparatus for controlling shooting of a virtual object, an electronic device, and a storage medium are provided. The technical solutions are described as follows:

According to an aspect of an example embodiment, a method for controlling shooting of a virtual object in a shooting game application is provided, performed by an electronic device, the method including:

obtaining a locking area of a first virtual object in a virtual scene;

based on determining that an aiming point of a second virtual object being within the locking area for a target duration, displaying locking complete information at a position of the aiming point in the locking area, the locking complete information indicating that locking of the first virtual object is completed; and controlling automatic shooting of the second virtual object on the first virtual object, of which locking is completed, based on the aiming point being located in an under-attack area of the first virtual object, a size of the under-attack area being less than a size of the locking area.

According to an aspect of an example embodiment, an apparatus for controlling shooting of a virtual object in a shooting game application is provided, including:

at least one memory configured to store program code; and at least one processor configured to read the program code and operate as instructed by the program code, the program code comprising:

obtaining code configured to cause at least one of the at least one processor to obtain a locking area of a first virtual object in a virtual scene;

display code configured to cause at least one of the at least one processor to, based on determining that an aiming point of a second virtual object is within the locking area for a target duration, display locking complete information at a position of the aiming point in the locking area, the locking complete information indicating that locking of the first virtual object is completed; and control code configured to cause at least one of the at least one processor to control automatic shooting of the second virtual object on the first virtual object, of which locking is completed, based on the aiming point being located in an under-attack area of the first virtual object, a size of the under-attack area being less than a size of the locking area.

According to an aspect of an example embodiment, an electronic device is provided, including one or more processors and one or more memories, the one or more memories storing at least one computer-readable instruction, the computer-readable instruction being loaded and executed by the one or more processors to implement the operations performed in the method for controlling shooting of a virtual object.

According to an aspect of an example embodiment, one or more computer-readable storage media are provided, storing at least one computer-readable instruction, the computer-readable instruction being loaded and executed by one or more processors to implement the operations performed in the method for controlling shooting of a virtual object.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts.

DETAILED DESCRIPTION

Figure 1:
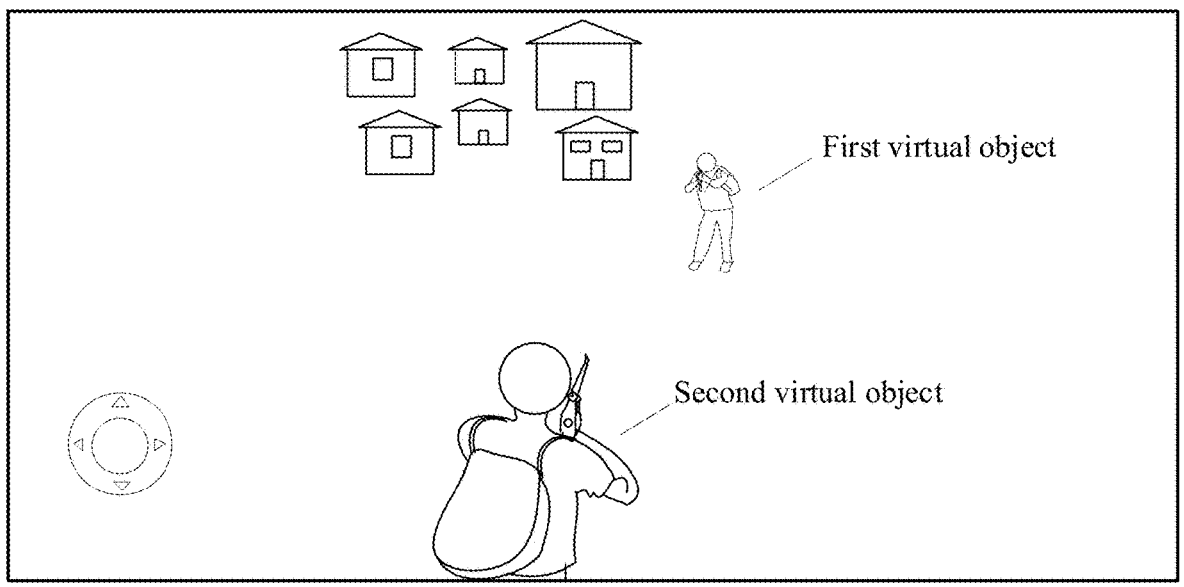
FIG. 1 is a schematic diagram of a terminal interface according to an embodiment of the disclosure.

To make objectives, technical solutions, and advantages of the disclosure clearer, the following further describes implementations of the disclosure in detail with reference to the accompanying drawings. It is to be understood that the specific implementations described herein are merely used for describing the disclosure, instead of limiting the disclosure.

Embodiments of the disclosure mainly relate to a video game scene or a simulation training scene. Using the video game scene as an example, a user may perform an operation on a terminal. After detecting the operation of the user, the terminal may download a game configuration file of the video game. The game configuration file may include an application program, interface display data, virtual scene data, or the like of the video game, so that the user may invoke the game configuration file while logging in to the video game on the terminal, to render and display an interface of the video game. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

The virtual scene in the disclosure may be used for simulating a three-dimensional virtual space, a two-dimensional virtual space, or a 2.5-dimensional virtual space. The virtual space may be an open space. The virtual scene may be used for simulating a real environment in reality. For example, the virtual scene may include a sky, land, an ocean, or the like. The land may include environmental elements such as a desert and a city. The user may control the virtual object to move in the virtual scene. The virtual object may be a virtual image used for representing the user, or may be a virtual image used for representing a creature in association with the user, for example, a pet. The virtual image may be in any form, for example, a human or an animal, and is not limited in the disclosure.

The virtual scene may further include another virtual object. That is, the virtual scene may include a plurality of virtual objects. Each virtual object has a shape and a volume of the virtual object in the virtual scene, and occupies a part of the space in the virtual scene. Using a shooting game as an example, the user may control the virtual object to freely fall, glide, or open a parachute to fall in the sky of the virtual scene, or run, jump, crawl, or stoop to move forward on the land, or may control the virtual object to swim, float, or dive in the ocean. The user may alternatively control the virtual object to take a vehicle to move in the virtual scene. The foregoing scenes are merely used as an example for description, and this is not specifically limited in the embodiments of the disclosure. The user may further control the virtual object to fight against another virtual object by using a virtual item. The virtual item may be a cold weapon, or may be a hot weapon, and is not specifically limited in the embodiments of the disclosure.

Generally, a terminal screen displays a viewing angle picture of a virtual object currently controlled by a terminal. The terminal screen may further display an aiming point of the virtual object currently controlled by the terminal. The aiming point may be used for annotating an aiming target in the viewing angle picture of the virtual object currently controlled by the terminal. In this case, a position of the aiming point in the virtual scene may be used as an attack point of the virtual object currently controlled by the terminal.

Specifically, the aiming point may be displayed at a center position of the terminal screen. The aiming point may be alternatively displayed in another position, and this is not specifically limited in the embodiments of the disclosure. The aiming point may have a plurality of display styles. In this case, the aiming point may be displayed in a default display style of a system, or may be displayed in a display style adjusted according to a user setting. Based on the aiming point displayed on the terminal, the user may determine whether a position currently corresponding to the aiming point in the virtual scene is an area at which the user wants to aim. If not, the user may adjust a viewing angle of the virtual scene by performing a viewing angle adjustment operation, to adjust the area aimed at by the aiming point. It is desirable to adjust the aiming point onto another virtual object in the virtual scene quickly and accurately, to perform an operation such as shooting, slapping, or boxing on the another virtual object.

In the embodiments of the disclosure, using the terminal described above being a terminal of a user as an example, the another virtual object may be referred to as a first virtual object, and the virtual object controlled by the terminal of the user is referred to as a second virtual object. In the terminal of the user, the virtual scene may be displayed at any viewing angle, and the displayed virtual scene may include the first virtual object located in the display area.

For example, as shown in FIG. 1, the terminal may display a viewing angle picture of the second virtual object in a user graphical interface, the viewing angle picture may include a virtual scene, and the virtual scene may include the first virtual object, and may further include the second virtual object. In another example, the second virtual object may not be included in the virtual scene (e.g., when a first-person viewing angle described below is applied).

Generally, when a virtual scene is displayed in the shooting game, two display manners may be included: a first-person viewing angle and a third-person viewing angle. The first-person viewing angle is used for simulating a viewing angle of the virtual object to observe the virtual scene, and in the display manner of the first-person viewing angle, a virtual camera may be generally located at an eye of the virtual object, or at a surrounding area of the eye of the virtual object, for example, a head or a chest of the virtual object. The third-person viewing angle is used for simulating a viewing angle from a position around the virtual object to observe the virtual scene, and in the display manner of the third-person viewing angle, the virtual camera may be generally located at a back of the virtual object, to display the virtual object in the virtual scene, so that the user may see actions of the virtual object and an environment in which the virtual object is located in the virtual scene.

Figure 2:
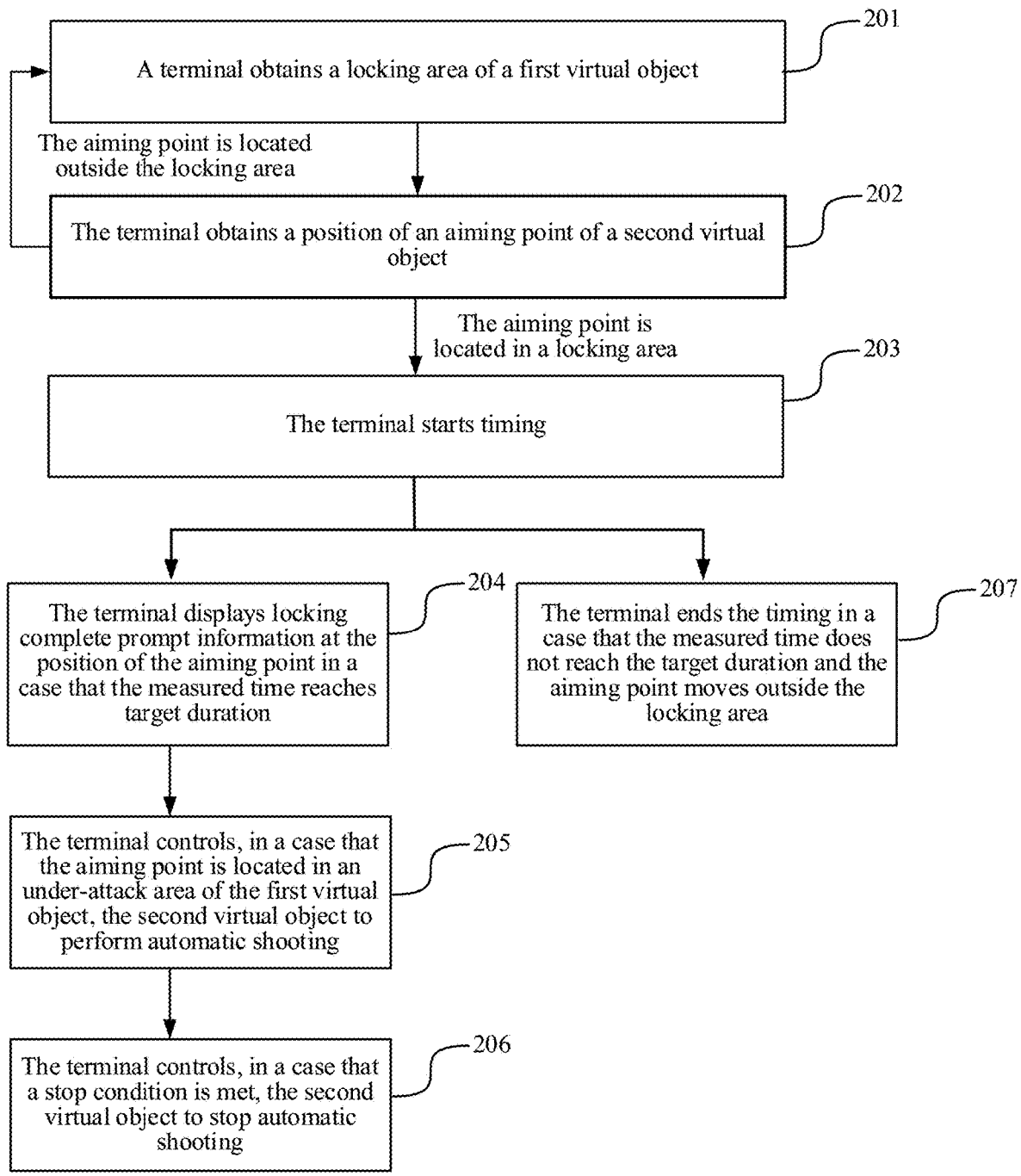
FIG. 2 is a flowchart of a method for controlling shooting of a virtual object according to an embodiment of the disclosure.

FIG. 2 is a flowchart of a method for controlling shooting of a virtual object according to an embodiment of the disclosure. The method is applicable to an electronic device, and the electronic device being a terminal is merely used as an example for description herein. Referring to FIG. 2, the method includes the following operations:

201. A terminal obtains a locking area of a first virtual object.

The terminal may provide an automatic shooting function. With the automatic shooting function, the virtual object may perform automatic shooting without a shooting operation of the user. In an example embodiment of the disclosure, a trigger condition may be set for the automatic shooting function. The trigger condition may be that locking of the first virtual object is completed. Therefore, the terminal needs to first determine, according to a user operation, whether the locking of the first virtual object is completed.

In an embodiment, before operation 201, the terminal may determine whether the first virtual object is included in the viewing angle picture of the second virtual object. If a view-angle range of the second virtual object includes the first virtual object, the terminal may perform Operation 201 of obtaining the locking area of the first virtual object, to determine, according to the locking area, whether the first virtual object may be locked, to determine whether to provide the automatic shooting function. However, if the viewing angle picture of the second virtual object does not include the first virtual object, the second virtual object does not have a shooting target, and there is no need to provide the automatic shooting function. Therefore, there is no need to perform operation 201.

The locking area is an area range around the first virtual object and used for locking the first virtual object. A size of the locking area of the first virtual object is greater than that of an under-attack area of the first virtual object, and less than the view-angle range of the second virtual object. The locking area is a preparation area used for triggering automatic shooting. When an aiming point of the second virtual object is in the locking area, that means the second virtual object enters a preparation state for determining whether to perform automatic shooting on the first virtual object. When the aiming point of the second virtual object enters the under-attack area of the first virtual object, the second virtual object is instantly triggered to perform automatic shooting.

In an example embodiment, the locking area may be an area with the first virtual object being the center. A shape of the locking area may be a cylinder, a sphere, another regular shape, or another irregular shape. A specific shape of the locking area may be set by a person skilled in the art as appropriate, and is not limited in an example embodiment of the disclosure.

In an embodiment, the terminal may obtain the locking area of the first virtual object according to a distance between the first virtual object and the second virtual object, a size of the locking area being positively correlated with the distance. That is, when the distance is larger, the size of the locking area is larger. When the distance is smaller, the size of the locking area is smaller. In this way, when the distance between the first virtual object and the second virtual object is large, while a display size of the first virtual object is small, a display size of the locking area of the first virtual object may not be excessively small, so that the user may easily move the position of the aiming point into the locking area of the first virtual object through an operation, to aim and shoot the first virtual object.

Some virtual items may perform the automatic shooting function, whereas some other virtual items cannot support the automatic shooting function. For example, some virtual items may perform continuous shooting, whereas some other virtual items may perform only single-shot shooting. The automatic shooting function is mainly used for virtual items that may perform continuous shooting. Therefore, types of the virtual items that provide the automatic shooting function may be set.

In an example embodiment, the terminal may obtain a type of a virtual item controlled by the second virtual object, and perform operation 201 and the operations of obtaining a locking area, displaying locking complete prompt information (or locking complete information) indicating that locking is completed, and controlling automatic shooting when the type of the virtual item is a target type. When the type is not the target type, the terminal may skip operation 201, and does not need to perform the subsequent operations of displaying locking complete information and controlling automatic shooting. The type of the virtual item and the target type may be set by a person skilled in the art as appropriate, or may be set by the user, and this is not limited in an example embodiment of the disclosure.

In an embodiment, if the first virtual object is completely occluded by a virtual article in a virtual scene in the viewing angle picture (or in the viewing angle) of the second virtual object, the user actually cannot see the first virtual object, and there is no need to provide the automatic shooting function. Therefore, the terminal may first determine whether the first virtual object is completely occluded, and if not, the terminal may provide the automatic shooting function. That is, the operations of obtaining a locking area, displaying locking complete information, and controlling automatic shooting are performed when there is no complete occlusion between the first virtual object and the second virtual object. However, when there is complete occlusion between the first virtual object and the second virtual object, the terminal does not need to provide the automatic shooting function.

In an example embodiment, the complete occlusion may be determined in the following manner: When any of connecting lines between a virtual camera of the second virtual object and the first virtual object does not pass through a virtual article (or virtual item) in a virtual scene, the terminal may perform the operations of obtaining a locking area, displaying locking complete information, and controlling automatic shooting. However, when all connecting lines between the virtual camera of the second virtual object and the first virtual object pass through a virtual article in the virtual scene, the terminal does not need to perform the operations of obtaining a locking area, displaying locking complete information, and controlling automatic shooting.

202. The terminal obtains a position of an aiming point of a second virtual object, performs operation 203 when the aiming point is located in the locking area, and continues to perform operations 201 and 202 when the aiming point is located outside the locking area.

The terminal may obtain the position of the aiming point of the second virtual object, to determine a positional relationship between the aiming point and the locking area of the first virtual object. The user may have different operation intentions based on different positional relationships, and results of determining whether the automatic shooting function needs to be provided are also different according to the different positional relationships.

The positional relationship may include two types: In the first type, the aiming point is located in the locking area, and the aiming point is relatively close to the first virtual object. It indicates that the user may want to aim at the first virtual object, the following operation 203 may then be performed, to further determine the operation intention of the user. In the second type, the position of the aiming point is located outside the locking area, and the aiming point is relatively far away from the first virtual object. It indicates that the user may not want to aim at the first virtual object, so that there is no need to provide the automatic shooting function. Therefore, operations 201 and 202 may continue to be performed to re-determine the positional relationship between the aiming point and the locking area, to determine whether the user intends to aim at the first virtual object.

Figure 3:
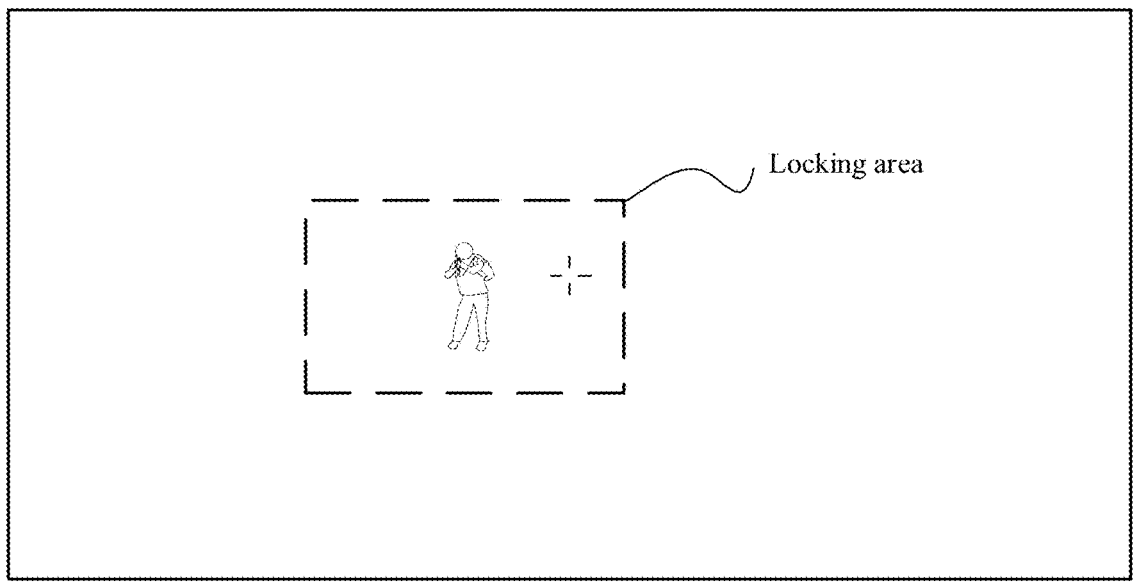
FIG. 3 is a schematic diagram of a locking area according to an embodiment of the disclosure.
Figure 4:
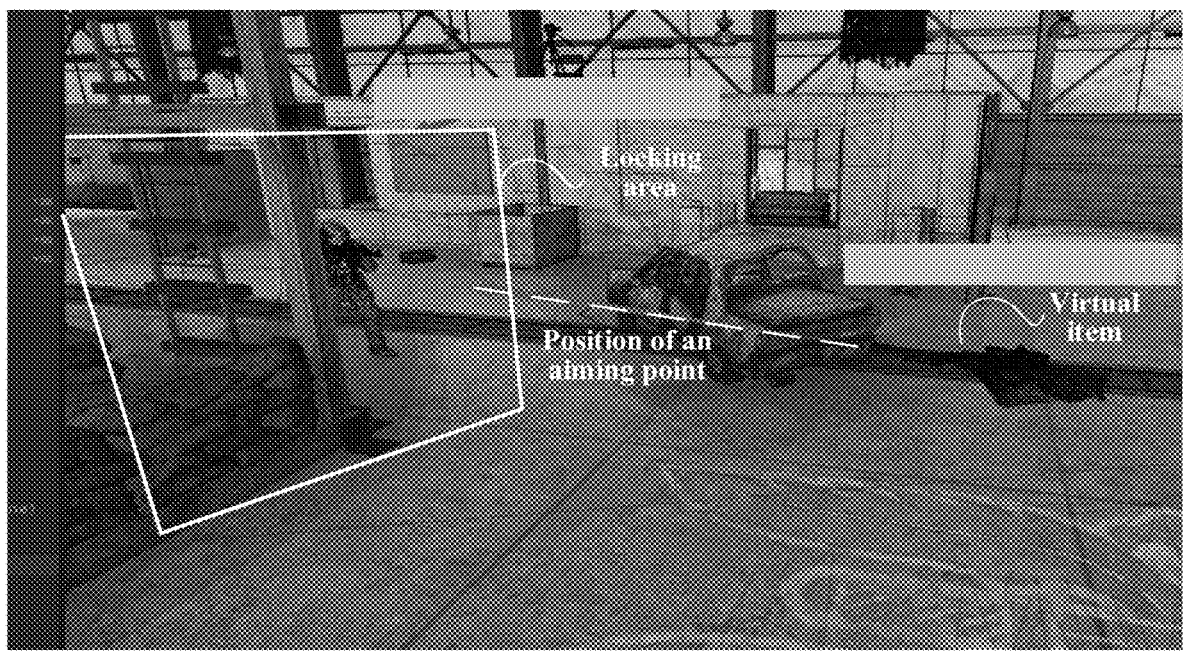
FIG. 4 is a schematic diagram of a locking area according to an embodiment of the disclosure.

In an embodiment, the position of the aiming point obtained by the terminal may be in the form of coordinates, and the obtained locking area may be in the form of a coordinate range. The terminal may determine whether position coordinates of the aiming point are within the coordinate range of the locking area. If yes, it is determined that the aiming point is located in the locking area, and if not, it is determined that the aiming point is located outside the locking area. For example, as shown in FIG. 3, the locking area may be an area around the first virtual object, and the aiming point may be in the locking area. From another viewing angle (e.g., third-person viewing angle), as shown in FIG. 4, in an actual virtual scene, the aiming point is in the locking area.

In another possible implementation, the determining process may be further implemented by using ray detection. The terminal may emit a ray in a viewing angle direction from a position of the aiming point, and return an identifier of the locking area or a collision result when the ray collides with the locking area (or a position within the locking area), to determine that the aiming point is located in the locking area; and if there is no collision, the aiming point is located outside the locking area. The process of emitting the ray may be implemented by invoking an interface of Unity, which is a product launched by the Unity company.

A sequence of performing operations 201 and 202 may be random. For example, the terminal may first perform operation 201 and then perform operation 202, or may first perform operation 202 and then perform operation 201, or may perform operations 201 and 202 simultaneously. The sequence of performing operations 201 and 202 is not limited in an example embodiment of the disclosure.

203. The terminal starts timing, and performs operation 204 or operation 207 according to different cases in a timing process.

When it is determined that the aiming point is located in the locking area, the terminal may start timing to further determine whether the user is aiming at the first virtual object. If the aiming point remains in the locking area for a period of time, it indicates that the user may be aiming at the first virtual object; and if the aiming point moves outside the locking area within the period of time, it indicates that the user may not be aiming at the first virtual object. Based on such a principle, target duration may be set, to determine, according to a case within the target duration after the start of the timing, whether to provide the automatic shooting function. For a detailed description, reference may be made to the following operations 204 and 207.

In an embodiment, after the terminal starts timing, the terminal may display locking preparation prompt information (or locking preparation information) at the position of the aiming point of the second virtual object. The locking preparation information is used for indicating that locking of the first virtual object is being prepared. The user may learn about a condition for locking the first virtual object by observing the displayed locking preparation information, and may continue to control the aiming point around the first virtual object, or move the aiming point onto the first virtual object.

Figure 5:
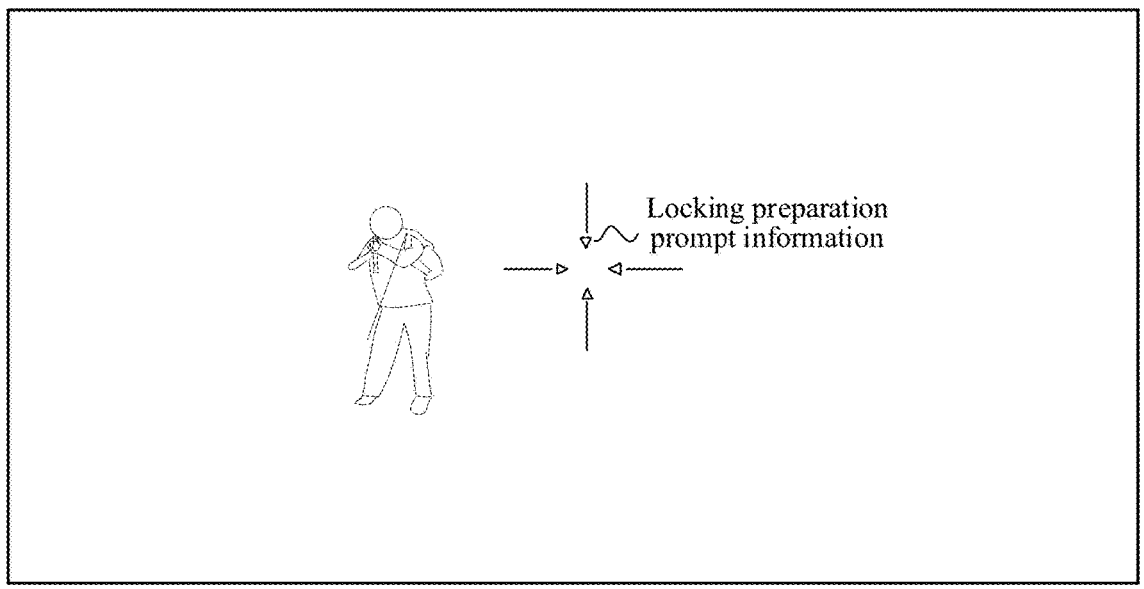
FIG. 5 is a schematic diagram of locking preparation information according to an embodiment of the disclosure.
Figure 6:
FIG. 6 is a schematic diagram of locking preparation information according to an embodiment of the disclosure.

The locking preparation information may be in the form of graphics, text, or special effects. In an example embodiment, the locking preparation information may include a plurality of triangles displayed at the position of the aiming point, and the plurality of triangles are all facing the position of the aiming point. For example, as shown in FIG. 5, the terminal may display triangular graphics at the position of the aiming point, to indicate locking of the first virtual object is being prepared, and an example terminal interface based on FIG. 5 may be shown in FIG. 6.

204. The terminal displays locking complete information at the position of the aiming point when the measured time reaches target duration.

When it is determined that the user is continuously aiming at the first virtual object until the timing reaches the target duration, the automatic shooting function may be provided. The terminal displays the locking complete information at the position of the aiming point, the locking complete information being used for indicating that locking of the first virtual object is completed. If the condition for automatic shooting is met later, the second virtual object may be controlled to perform automatic shooting.

The target duration may be set by a person skilled in the art as appropriate or by the user, and is not limited in an example embodiment of the disclosure. For example, there may be a conversion relationship between the target duration, the size of the locking area, and a size of the following under-attack area. In an example, the target duration may be set based on an estimated time to be taken for the user to move the aiming point from the locking area to the under-attack area through a normal aiming operation. In another example, the target duration may be alternatively set by a person skilled in the art randomly.

Figure 7:
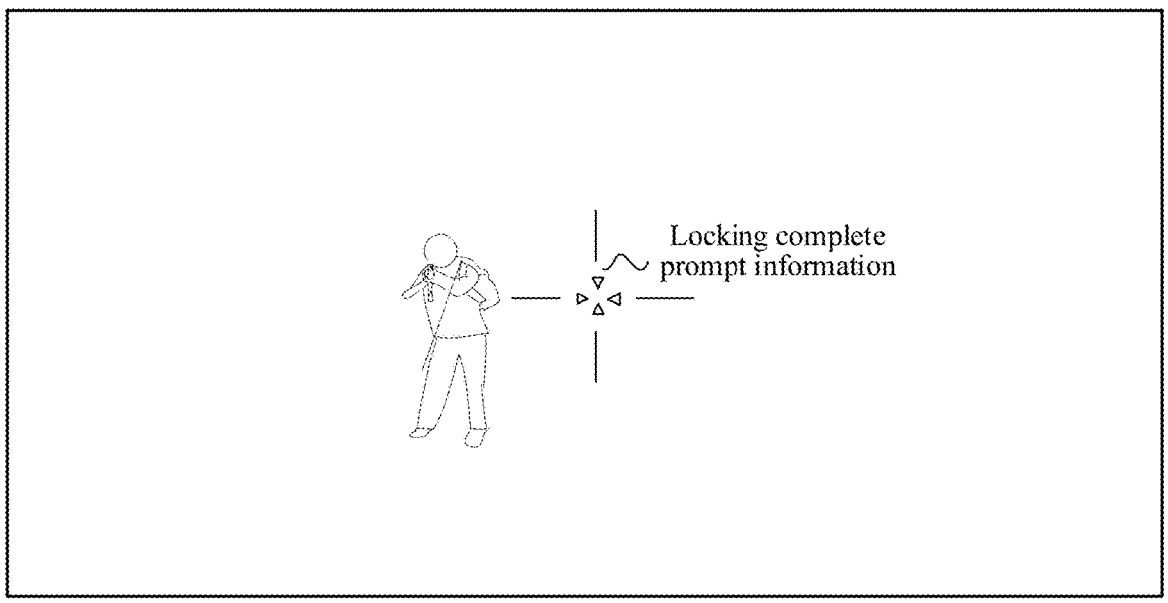
FIG. 7 is a schematic diagram of locking complete information according to an embodiment of the disclosure.
Figure 8:
FIG. 8 is a schematic diagram of locking complete information according to an embodiment of the disclosure.

In an example embodiment, the locking complete information may include a plurality of triangles, and the plurality of triangles are all facing the position of the aiming point. In an embodiment, a display style of the locking complete information may be different from a display style of the locking preparation information. For example, the display styles may have different colors, and distances between the display position of the information and the position of the aiming point may be different. For example, as shown in FIG. 7, the terminal may display a plurality of triangles at the position of the aiming point, and distances between the plurality of triangles and the position of the aiming point are closer than those in FIG. 5, that is, the triangles are indented. In addition, the color may be changed, although the change in color is not shown in the figure. An example terminal interface is shown in FIG. 8.

Operations 203 and 204 are the process of displaying, when duration for which an aiming point of a second virtual object remains in the locking area reaches target duration, the locking complete information at the position of the aiming point. In the process, it is determined, by using two dimensions, namely, the positional relationship between the aiming point and the first virtual object and the duration for which the aiming point and the first virtual object maintain the positional relationship, whether the locking of the first virtual object is completed. Operations 203 and 204 are performed in a case in which specific conditions are met, to display the locking complete information at the position of the aiming point. However, if any of the above conditions of the two dimensions is not met, the terminal does not need to display the locking complete information at the position of the aiming point, for example, when the aiming point is located outside the locking area in the foregoing operation 202 or in operation 207. Alternatively, the terminal may display locking failure prompt information (or locking failure information).

205. The terminal controls, when the aiming point is located in an under-attack area of the first virtual object, the second virtual object to perform automatic shooting.

The under-attack area is an area into which shooting may be performed by an opponent (e.g., the second virtual object). When the aiming point of the second virtual object is located in the under-attack area of the first virtual object and the automatic shooting is triggered, shooting may be performed by the second virtual object on the first virtual object.

The size of the under-attack area is less than the size of the locking area.

After displaying the locking complete information at the position of the aiming point, the terminal has provided the automatic shooting function, and further needs to determine whether the aiming point is in the under-attack area of the first virtual object, to determine whether to control the second virtual object to perform automatic shooting.

Before operation 205, the terminal may further obtain the under-attack area of the first virtual object. The size of the under-attack area is less than the size of the locking area. That is, when locking of the first virtual object is completed and the user wants to perform shooting on the first virtual object, the aiming point needs to be moved to a position closer to the first virtual object, so that the under-attack area may be set, and the size of the under-attack area is less than the size of the locking area.

In an embodiment, based on different distances between the first virtual object and the second virtual object, the under-attack area may have different sizes. The terminal may obtain an under-attack area of the first virtual object according to a distance between the first virtual object and the second virtual object, a size of the under-attack area being positively correlated with the distance. That is, when the distance is larger, the size of the under-attack area is larger, and when the distance is smaller, the size of the under-attack area is smaller.

For example, the terminal may obtain a target size of the under-attack area according to the distance between the first virtual object and the second virtual object, and obtain an area with the first virtual object being the center and a size being the target size as the under-attack area of the first virtual object. In this way, the under-attack area is a smaller area around the first virtual object than the locking area. If the user wants to aim at the first virtual object, the user may move the aiming point into the under-attack area, so that the terminal may control the second virtual object to perform automatic shooting. An area containing the first virtual object is used as the under-attack area instead of using an area of the first virtual object as the under-attack area. Accordingly, the problem that the automatic shooting may be easily stopped due to inaccurate user operations to aim at the first virtual object in the case of using the area of the first virtual object as the under-attack area is solved, thereby effectively improving continuity of automatic shooting and greatly improving user experience. In addition, through the foregoing process of triggering particular conditions to display the locking complete information at the position of the aiming point, convenient operations are provided, and meanwhile, fairness of video games is ensured.

Figure 9:
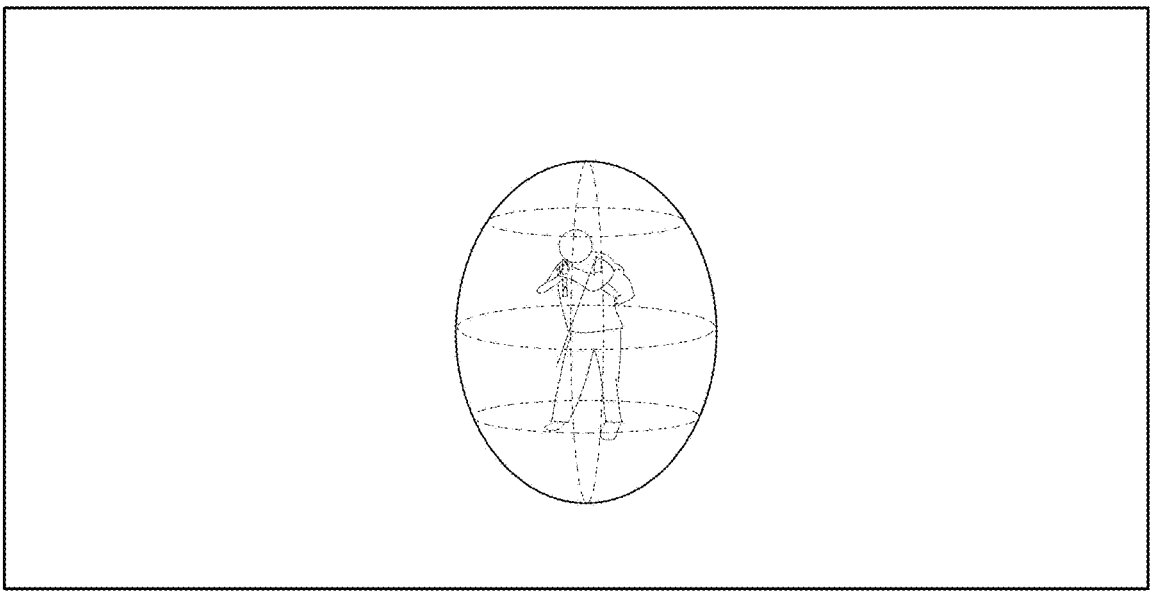
FIG. 9 is a schematic diagram of an under-attack area according to an embodiment of the disclosure.
Figure 10:
FIG. 10 is a schematic diagram of an under-attack area according to an embodiment of the disclosure.

A shape of the under-attack area may be a cube, a sphere, an ellipsoid, another any regular shape, or another any irregular shape. The shape of the under-attack area may be defined by a person skilled in the art, and is not limited in an example embodiment of the disclosure. For example, as shown in FIG. 9 and FIG. 10, using the under-attack area having a shape of an ellipsoid containing the first virtual object as an example, the size of the under-attack area is greater than the size of the first virtual object.

An example in which the terminal obtains the under-attack area according to the distance between the first virtual object and the second virtual object is merely used for description above. In another possible implementation, the size of the under-attack area may be fixed, and the terminal directly obtains an area with a preset size as the under-attack area. Through the foregoing operation 204, the locking complete information is displayed at the position of the aiming point. In this case, the aiming point may be already located in the under-attack area of the first virtual object, and the terminal may control the second virtual object to perform automatic shooting; or the aiming point may be outside the under-attack area at that time, but the user may move the aiming point into the under-attack area by changing the position of the aiming point, so that the terminal may control the second virtual object to perform automatic shooting.

Similarly, the process for the terminal to determine whether the aiming point is located in the under-attack area is the same as the process for the terminal to determine whether the aiming point is located in the locking area in the foregoing operation 202, and may include at least two implementations. In an example embodiment, the foregoing operation of obtaining the under-attack area by the terminal may be performed when operation 201 is performed, and the terminal may determine, by using ray detection, an area in which the aiming point is currently located. Specifically, different levels may be set for the two areas, a ray is emitted from the aiming point, and it may be determined, according to a level from which the ray returns, whether the aiming point is located in the locking area or the under-attack area. Because the size of the under-attack area is less than the size of the locking area, the locking area may include the under-attack area. If the aiming point is located in the under-attack area, the aiming point is also located in the locking area.

Figure 11:
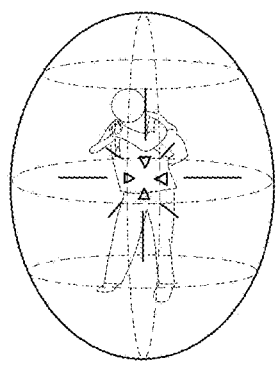
FIG. 11 is a schematic diagram of automatic shooting according to an embodiment of the disclosure.
Figure 12:
FIG. 12 is a schematic diagram of automatic shooting according to an embodiment of the disclosure.

For example, as shown in FIG. 11, the locking of the first virtual object is completed and the aiming point is located in the under-attack area, the terminal controls the second virtual object to perform automatic shooting, and an example terminal interface may be shown in FIG. 12. In another example, initially there may be a virtual article (or virtual item) between the first virtual object and the second virtual object. As a result, the first virtual object may be invisible in the viewing angle picture of the second virtual object. However, the first virtual object may suddenly appear in the viewing angle picture of the second virtual object after moving. By determining the target duration, a reaction time for a person to make a shooting action in such a scene may be simulated. In an example, the display styles of the locking complete information and the aiming point during automatic shooting may be different from display styles in a normal state.

The above describes an example in which the terminal controls the second virtual object to perform automatic shooting upon particular conditions being met. In another example, the user may not want to shoot the first virtual object, and may move the aiming point to another position. When the aiming point is moved outside the locking area of the first virtual object, the first virtual object no longer meets the locking conditions. Therefore, the terminal may cancel the display of the locking complete information, and does not need to perform operation 205.

206. The terminal controls, when a stop condition is met, the second virtual object to stop automatic shooting.

The stop condition may further be set, to trigger the terminal, which currently performs automatic shooting, to control the second virtual object to stop automatic shooting. Specifically, there may be a plurality of types of stop conditions. When any one of the stop conditions is met, the terminal may control the second virtual object to stop automatic shooting. In an example embodiment, operation 206 may be any one of the following operations 1 to 4; however, these are merely given as examples and the embodiments are not limited thereto.

Operation 1. The terminal controls, based on detecting that the aiming point moves outside the under-attack area of the first virtual object, the second virtual object to stop automatic shooting.

In operation 1, in the automatic shooting process, the first virtual object may be moved, and the user may change the position of the aiming point. As a result, the aiming point moves outside the under-attack area. In this case, the condition for the automatic shooting is no longer met, and the terminal may control the second virtual object to stop automatic shooting.

Operation 2. The terminal controls, when a quantity of projectiles of the virtual item controlled by the second virtual object is zero, the second virtual object to stop automatic shooting.

In operation 2, in the automatic shooting process, the quantity of the projectiles of the virtual item controlled by the second virtual object may drop to zero, and the shooting cannot be continued. Therefore, the terminal may control the second virtual object to stop automatic shooting.

Operation 3. The terminal controls, when there is complete occlusion between the first virtual object and the second virtual object, the second virtual object to stop automatic shooting.

In operation 3, in the automatic shooting process, the first virtual object or the second virtual object may be moved. As a result, the first virtual object may be completely occluded by a virtual article in the virtual scene, and the first virtual object may disappear in the viewing angle picture of the second virtual object. In this case, the second virtual object no longer needs to perform shooting, the shooting cannot cause damage to the first virtual object, and the terminal may control the second virtual object to stop automatic shooting.

Operation 4. The terminal controls, when the first virtual object is in an eliminated state or a seriously injured state, the second virtual object to stop automatic shooting.

In operation 4, in the automatic shooting process, the first virtual object is in the eliminated state (that is, eliminated from game play), and the second virtual object then loses a target that needs to be shot. Therefore, the terminal may control the second virtual object to stop automatic shooting. Alternatively, the first virtual object is in the seriously injured state, and the first virtual object is already at an extreme disadvantage. The terminal may control the second virtual object to stop automatic shooting, and the user manually controls the second virtual object to perform shooting, which provides simplified operations and convenience, and meanwhile, ensures the fairness of video games.

207. The terminal ends the timing when the measured time does not reach the target duration and the aiming point moves outside the locking area.

When the timing does not reach the target duration but the aiming point moves outside the locking area, it indicates that the user may not want to aim at the first virtual object, or the user may have lost an opportunity to lock the first virtual object due to an operation error. In this case, the terminal may end the timing. That is, the process of locking the first virtual object at this time fails.

The above is a process of locking one first virtual object and providing the automatic shooting function. The viewing angle picture of the second virtual object may include a plurality of first virtual objects. In this case, a target switching condition may be further set. If the first virtual object and the second virtual object meet a specific condition, after one of the first virtual objects is shot, another first virtual object may be locked without a limit of the target duration again, and the automatic shooting function may be provided if the positional relationship between the aiming point and the locking area meets the condition.

For example, the terminal may continuously display the locking complete information at the position of the aiming point when a view-angle range of the second virtual object includes a plurality of first virtual objects, one first virtual object is in an eliminated state or a seriously injured state, and the aiming point is located in a locking area of another first virtual object.

In an example embodiment, when a view-angle range of the second virtual object includes a plurality of first virtual objects, one first virtual object is in an eliminated state or a seriously injured state, and the aiming point is located in an under-attack area of another first virtual object, the terminal may control the second virtual object to continuously perform automatic shooting.

Figure 13:
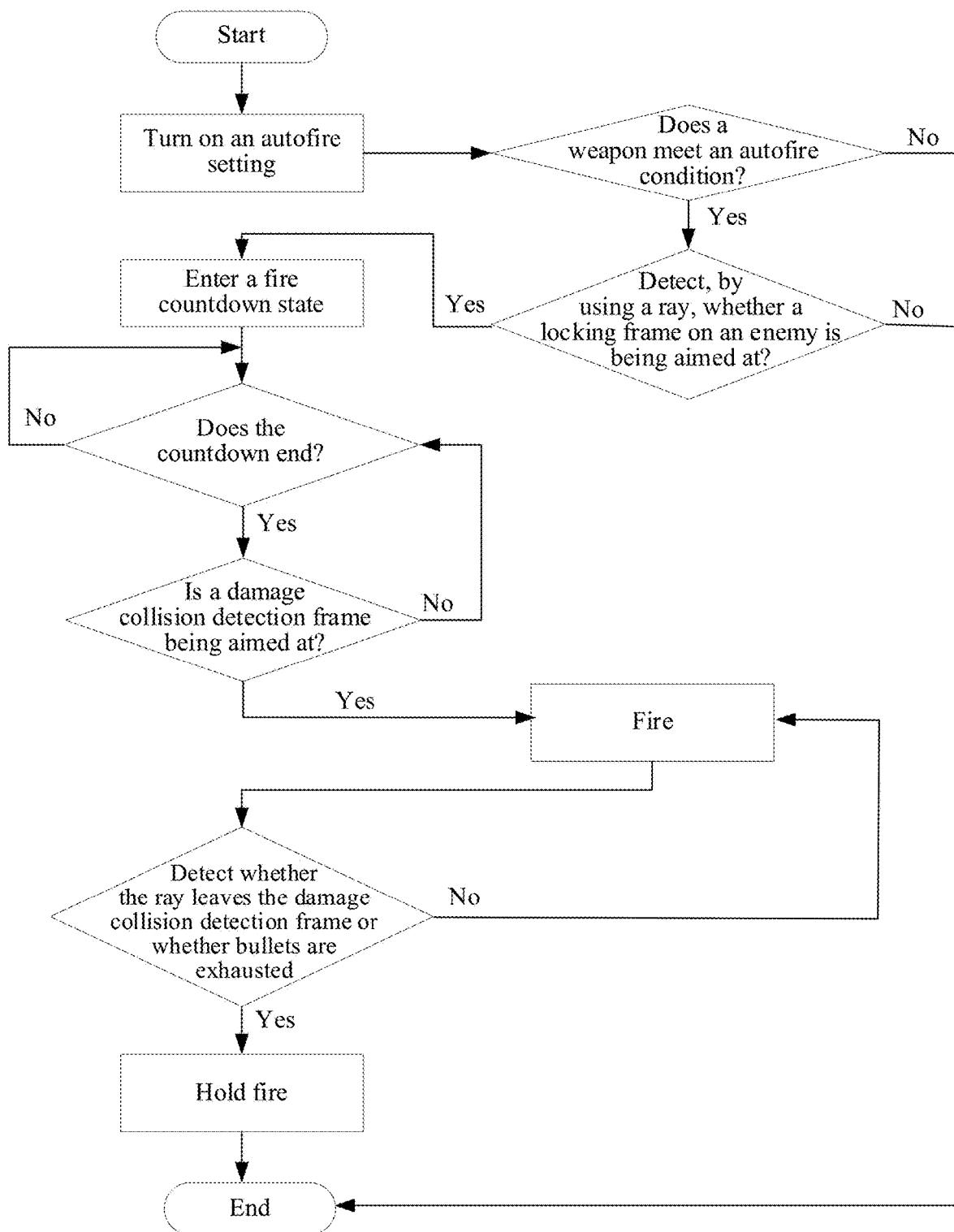
FIG. 13 is a flowchart of a method for controlling shooting of a virtual object according to an embodiment of the disclosure.

An example process of the foregoing method for controlling shooting of a virtual object is described below by using an example through FIG. 13. Referring to FIG. 13, in this example, shooting is referred to as "fire", the automatic shooting function may correspond to a switch button, and the user may turn on or off the automatic shooting function by operating the switch button. In an example embodiment of the disclosure, the user may first turn on an autofire setting, and the terminal may determine whether a weapon (a virtual item) meets an autofire condition. This operation is to determine whether a type of the virtual item is a target type. In a project, attributes may be configured for each weapon through initialization (ini), an autofire attribute is added to configuration attributes of ini, and it may be subsequently determined, based on the autofire attribute, whether to perform autofire. The configuration may be performed in another manner. When it is determined that the weapon does not meet the autofire condition, the terminal does not need to continue to perform determining or provide the autofire function. However, if the weapon meets the autofire condition, it may be detected, by using a ray, whether a locking frame (that is, the locking area) on an enemy is being aimed at. If not, the terminal does not need to continue to perform determining; and if yes, the terminal may enter a fire countdown state, that is, start timing. The terminal may determine whether the countdown ends. When the countdown ends, it may be determined whether a damage collision detection frame (that is, the under-attack area) is being aimed at (e.g., within the target duration). If yes, the terminal may open fire; and if the damage collision detection frame is not being aimed at, the determining may be continued. It is determined above whether the countdown ends, and if not, the determining may be continued. After the terminal controls to open fire, the terminal may detect whether the ray leaves the damage collision detection frame or whether bullets are exhausted. If yes, the terminal may hold fire; and if not, the terminal may continuously open fire.

In an example embodiment of the disclosure, it is determined, according to the positional relationship between the aiming point of the second virtual object and the locking area and the duration for which the positional relationship is maintained, whether the locking complete information is displayed at the position of the aiming point. That is, it is determined whether the locking of the first virtual object is completed. If the locking is completed and the aiming point is in the under-attack area of the first virtual object, the second virtual object may be controlled to perform automatic shooting. An automatic shooting function is provided, so that no complex operations are required, and there is no conflict with other operations. The operations are convenient and fast, and the efficiency of controlling shooting of a virtual object is improved.

All the optional technical solutions may be combined randomly to form optional embodiments of the disclosure. Details are not described herein.

It is to be understood that, although the operations are displayed sequentially according to the instructions of the arrows in the flowcharts of the embodiments, these operations are not necessarily performed sequentially according to the sequence instructed by the arrows. Unless otherwise explicitly specified in the disclosure, execution of the operations is not strictly limited, and the operations may be performed in other sequences. Moreover, at least some of the operations in each embodiment may include a plurality of sub-operations or a plurality of stages. The sub-operations or stages are not necessarily performed at the same moment but may be performed at different moments. Execution of the sub-operations or stages is not necessarily sequentially performed, but may be performed alternately with other operations or at least some of sub-operations or stages of other operations.

Figure 14:
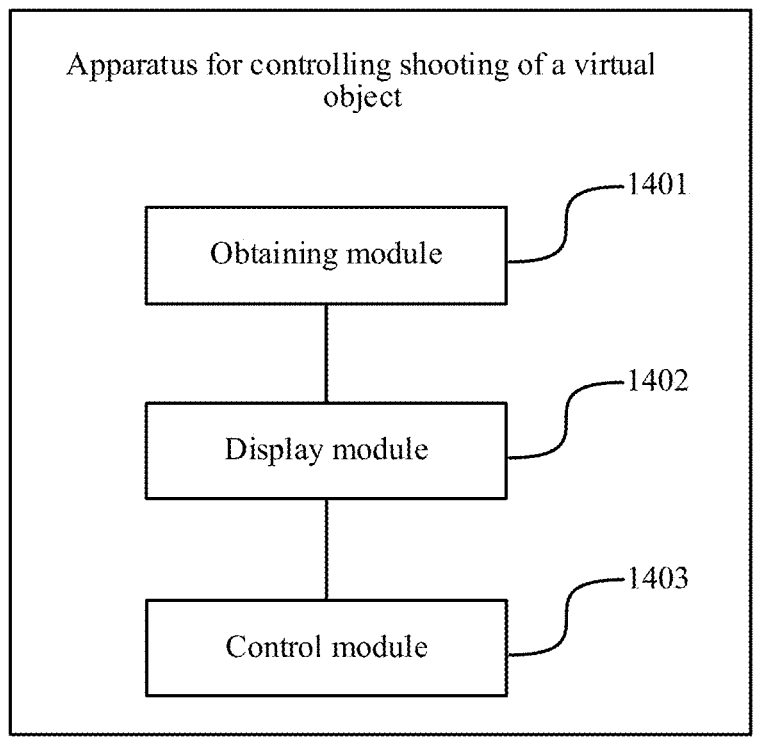
FIG. 14 is a schematic structural diagram of an apparatus for controlling shooting of a virtual object according to an embodiment of the disclosure.

FIG. 14 is a schematic structural diagram of an apparatus for controlling shooting of a virtual object according to an embodiment of the disclosure. The apparatus may be disposed on the electronic device in the foregoing embodiment. Referring to FIG. 14, the apparatus includes:

an obtaining module 1401, configured to obtain a locking area of a first virtual object;

a display module 1402, configured to display, when duration for which an aiming point of a second virtual object remains in the locking area reaches target duration, locking complete information at a position of the aiming point, the locking complete information being used for indicating that locking of the first virtual object is completed; and a control module 1403, configured to control automatic shooting of the second virtual object when the aiming point is located in an under-attack area of the first virtual object, a size of the under-attack area being less than a size of the locking area.

In an embodiment, the display module 1402 is configured to:

start timing when the aiming point of the second virtual object is located in the locking area; and displaying the locking complete information at the position of the aiming point when the measured time reaches the target duration.

In an embodiment, the display module 1402 is further configured to display locking preparation information at the position of the aiming point of the second virtual object.

In an embodiment, the display module 1402 is further configured to end the timing when the measured time does not reach the target duration and the aiming point moves outside the locking area.

In some embodiments, the obtaining module 1401 is further configured to obtain a type of a virtual item controlled by the second virtual object; and the obtaining module 1401, the display module 1402, and the control module 1403 are further configured to respectively perform the operations of obtaining a locking area, displaying locking complete information, and controlling automatic shooting when the type is a target type.

In an embodiment, the obtaining module 1401, the display module 1402, and the control module 1403 are further configured to respectively perform the operations of obtaining a locking area, displaying locking complete information, and controlling automatic shooting when there is no complete occlusion between the first virtual object and the second virtual object.

In an embodiment, the control module 1403 is further configured to perform any one of the following:

controlling, in a case of detecting that the aiming point moves outside the under-attack area of the first virtual object, the second virtual object to stop automatic shooting;

controlling, when a quantity of projectiles of the virtual item controlled by the second virtual object is zero, the second virtual object to stop automatic shooting;

controlling, when there is complete occlusion between the first virtual object and the second virtual object, the second virtual object to stop automatic shooting; and controlling, when the first virtual object is in an eliminated state or a seriously injured state, the second virtual object to stop automatic shooting.

In an embodiment, the display module 1402 is further configured to continuously display the locking complete information at the position of the aiming point when a view-angle range of the second virtual object includes a plurality of first virtual objects, one first virtual object is in an eliminated state or a seriously injured state, and the aiming point is located in a locking area of another first virtual object.

In an embodiment, the control module 1403 is further configured to control, when a view-angle range of the second virtual object includes a plurality of first virtual objects, one first virtual object is in an eliminated state or a seriously injured state, and the aiming point is located in an under-attack area of another first virtual object, the second virtual object to continuously perform automatic shooting.

In an embodiment, the obtaining module 1401 is further configured to obtain an under-attack area of the first virtual object according to a distance between the first virtual object and the second virtual object, a size of the under-attack area being positively correlated with the distance.

The obtaining module 1401 is further configured to obtain the locking area of the first virtual object according to the distance between the first virtual object and the second virtual object, a size of the locking area being positively correlated with the distance.

In an embodiment, the obtaining module 1401 is further configured to: obtain a target size of the under-attack area according to the distance between the first virtual object and the second virtual object; and obtain an area with the first virtual object being the center and a size being the target size as the under-attack area of the first virtual object.

By using the apparatus provided in an example embodiment of the disclosure, it is determined, according to the positional relationship between the aiming point of the second virtual object and the locking area and the duration for which the positional relationship is maintained, whether the locking complete information is displayed at the position of the aiming point. That is, it is determined whether the locking of the first virtual object is completed. If the locking is completed and the aiming point is in the under-attack area of the first virtual object, the second virtual object may be controlled to perform automatic shooting. An automatic shooting function is provided, so that no complex operations are required, and there is no conflict with other operations. The operations are convenient and fast, and the efficiency of controlling shooting of a virtual object is improved.

When the apparatus for controlling shooting of a virtual object provided in the foregoing embodiment controls the virtual object to shoot, only division of the foregoing functional modules is used as an example for description. In the practical application, the functions may be allocated to and completed by different functional modules depending on embodiments. That is, an internal structure of the electronic device is divided into different functional modules, to complete all or some of the functions described above. In addition, the apparatus for controlling shooting of a virtual object and the method for controlling shooting of a virtual object embodiments provided in the foregoing embodiments belong to the same concept. For a specific implementation process, refer to the method embodiment, and details are not described herein again.

Figure 15:
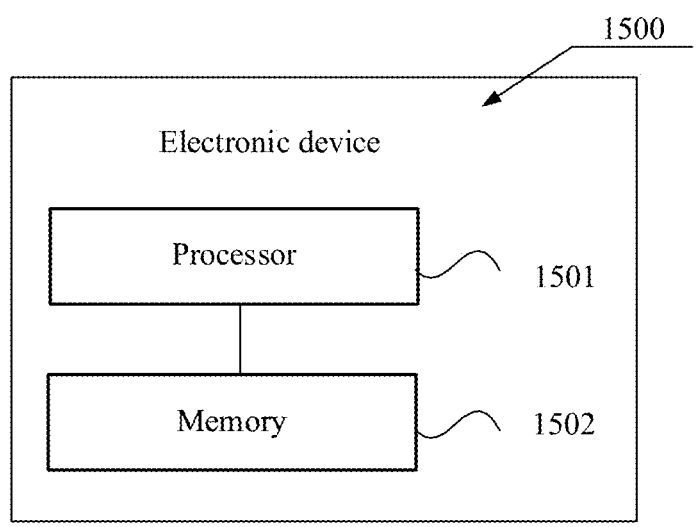
FIG. 15 is a schematic structural diagram of an electronic device according to an embodiment of the disclosure.

FIG. 15 is a schematic structural diagram of an electronic device according to an embodiment of the disclosure. The electronic device 1500 may vary a lot due to different configurations or performance, and may include one or more processors (central processing units, CPUs) 1501 and one or more memories 1502. The one or more memories 1502 stores at least one computer-readable instruction, the at least one computer-readable instruction being loaded and executed by the one or more processors 1501 to implement the method for controlling shooting of a virtual object provided in the foregoing method embodiments. The electronic device 1500 may further include components such as a wired or wireless network interface, a keyboard, and an input/output (I/O) interface, to facilitate input and output. The electronic device 1500 may further include another component configured to implement a function of a device. Details are not further described herein.

In an exemplary embodiment, a computer-readable storage medium, for example, a memory including computer-readable instructions, is further provided. The computer-readable instructions may be executed by a processor to implement the method for controlling shooting of a virtual object in the foregoing embodiment. For example, the computer-readable storage medium may be a read-only memory (ROM), a RAM, a compact disc ROM (CD-ROM), a magnetic tape, a floppy disk, an optical data storage device, or the like.

A person of ordinary skill in the art would understand that all or some of the operations of the foregoing embodiments may be implemented by using hardware, or may be implemented by a program instructing related hardware. The program may be stored in a computer-readable storage medium. The above-mentioned storage medium may be a ROM, a magnetic disk, an optical disc, or the like.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely exemplary embodiments of the disclosure, but are not intended to limit the disclosure. Any modification, equivalent replacement, or improvement made within the spirit and principle of the disclosure shall fall within the protection scope of the disclosure.

What is claimed is:

1. A method for controlling shooting of a virtual object in a shooting game application, the method being performed by an electronic device and comprising:
 obtaining a locking area of a first virtual object in a virtual scene;
 based on determining that an aiming point of a second virtual object being within the locking area for a target duration, displaying locking complete information at a position of the aiming point in the locking area, the locking complete information indicating that locking of the first virtual object is completed; and
 controlling automatic shooting of the second virtual object on the first virtual object, of which locking is completed, based on the aiming point being located in an under-attack area of the first virtual object, a size of the under-attack area being less than a size of the locking area.

2. The method according to claim 1, wherein the determining comprises:
 determining that the aiming point is located in the locking area based on position coordinates of the aiming point of the second virtual object being within a coordinate range of the locking area.

3. The method according to claim 1, wherein the determining comprises:

emitting a ray in a viewing angle direction of the virtual scene from the position of the aiming point of the second virtual object; and determining that the aiming point is located in the locking area based on the ray colliding with the locking area.

4. The method according to claim 1, wherein the displaying the locking complete information comprises:

starting timing based on the determining that the aiming point of the second virtual object is within the locking area; and displaying the locking complete information at the position of the aiming point in the locking area based on the timing that reaches the target duration while the aiming point of the second virtual object maintains in the locking area.

5. The method according to claim 4, further comprising, after the starting the timing:

displaying locking preparation information, indicating preparation of locking of the first virtual object, at the position of the aiming point of the second virtual object.

6. The method according to claim 5, wherein the locking preparation information includes at least two display items displayed around the position of the aiming point.

7. The method according to claim 6, wherein the locking complete information includes the at least two display items displayed around the position of the aiming point, and a display style of the at least two display items used in the locking complete information is different from a display style of the at least two display items used in the locking preparation information.

8. The method according to claim 4, further comprising, after the starting the timing:

ending the timing based on the aiming point moving outside the locking area before the timing reaches the target duration.

9. The method according to claim 1, further comprising:

obtaining a type of a virtual item controlled by the second virtual object; and performing operations of obtaining the locking area, displaying the locking complete information, and controlling the automatic shooting based on the type of the virtual item being a target type.

10. The method according to claim 1, wherein operations of obtaining the locking area, displaying the locking complete information, and controlling the automatic shooting are performed based on satisfaction of a condition that the first virtual object is not completely occluded in a viewing angle of the second virtual object.

11. The method according to claim 10, further comprising:

determining that the first virtual object is not completely occluded based on any connecting line between a virtual camera of the second virtual object and the first virtual object not passing through any virtual article in the virtual scene; or determining that the first virtual object is completely occluded based on all connecting lines between the virtual camera of the second virtual object and the first virtual object passing through any virtual article in the virtual scene.

12. The method according to claim 1, further comprising, after the controlling the automatic shooting, controlling the second virtual object to stop the automatic shooting based on detection of any one of the following:

the aiming point moves outside the under-attack area of the first virtual object;

a quantity of projectiles of a virtual item controlled by the second virtual object is zero;

the first virtual object is completely occluded; and the first virtual object is in an eliminated state or a seriously injured state.

13. The method according to claim 1, further comprising:

continuously displaying the locking complete information at the position of the aiming point, based on a view-angle range of the second virtual object comprising a plurality of first virtual objects, one first virtual object being in an eliminated state or a seriously injured state, and the aiming point being located in a locking area of another first virtual object.

14. The method according to claim 1, further comprising:

controlling the second virtual object to continuously perform the automatic shooting, based on a view-angle range of the second virtual object comprising a plurality of first virtual objects, one first virtual object being in an eliminated state or a seriously injured state, and the aiming point being located in an under-attack area of another first virtual object.

15. The method according to claim 1, further comprising, prior to the controlling the automatic shooting:

obtaining the under-attack area of the first virtual object according to a distance between the first virtual object and the second virtual object; and wherein the obtaining the locking area of the first virtual object comprises:

obtaining the locking area of the first virtual object according to the distance between the first virtual object and the second virtual object.

16. The method according to claim 15, wherein the obtaining the under-attack area of the first virtual object comprises:

obtaining a target size of the under-attack area according to the distance between the first virtual object and the second virtual object; and obtaining an area with the first virtual object being a center and a size being the target size as the under-attack area of the first virtual object.

17. An apparatus for controlling shooting of a virtual object in a shooting game application, disposed in an electronic device, the apparatus comprising:

at least one memory configured to store program code; and at least one processor configured to read the program code and operate as instructed by the program code, the program code comprising:

obtaining code configured to cause at least one of the at least one processor to obtain a locking area of a first virtual object in a virtual scene;

display code configured to cause at least one of the at least one processor to, based on determining that an aiming point of a second virtual object is within the locking area for a target duration, display locking complete information at a position of the aiming point in the locking area, the locking complete information indicating that locking of the first virtual object is completed; and control code configured to cause at least one of the at least one processor to control automatic shooting of the second virtual object on the first virtual object, of which locking is completed, based on the aiming point being located in an under-attack area of the first virtual object, a size of the under-attack area being less than a size of the locking area.

18. The apparatus according to claim 17, wherein the display code is further configured to cause at least one of the at least one processor to:

start timing based on the determining that the aiming point of the second virtual object is within the locking area; and display the locking complete information at the position of the aiming point in the locking area based on the timing that reaches the target duration while the aiming point of the second virtual object maintains in the locking area.

19. An electronic device, comprising one or more processors and one or more memories, the one or more memories storing at least one computer-readable instruction, the at least one computer-readable instruction being loaded and executed by the one or more processors to implement operations performed in the method according to claim 1.

20. A non-transitory computer-readable storage medium, storing at least one computer-readable instruction, the at least one computer-readable instruction being executable by at least one processor to perform:

obtaining a locking area of a first virtual object in a virtual scene;

based on an aiming point of a second virtual object being within the locking area for a target duration, displaying locking complete information at a position of the aiming point in the locking area, the locking complete information indicating that locking of the first virtual object is completed; and controlling automatic shooting of the second virtual object on the first virtual object, of which locking is completed, based on the aiming point being located in an under-attack area of the first virtual object, a size of the under-attack area being less than a size of the locking area.

\* \* \* \* \*